United States Patent
Draganoff

[11] Patent Number: 6,075,876
[45] Date of Patent: Jun. 13, 2000

[54] SLIDING YARDSTICKS FINGERPRINT ENROLLMENT AND VERIFICATION SYSTEM AND METHOD

[76] Inventor: Georgi Hristoff Draganoff, #36-2355 Fifth Line West, Mississauga, Ontario, Canada, L5K 2M8

[21] Appl. No.: 08/852,382

[22] Filed: May 7, 1997

[51] Int. Cl.[7] .............................. G06K 9/00; G06K 9/62
[52] U.S. Cl. ........................................... 382/124; 382/209
[58] Field of Search .................................. 382/124, 125, 382/126, 127, 192, 201, 209, 218, 275, 283

[56] References Cited

U.S. PATENT DOCUMENTS

| | | | |
|---|---|---|---|
| 2,615,992 | 10/1952 | Flory et al. | 179/100.3 |
| 2,616,983 | 11/1952 | Zworykin et al. | 179/100.3 |
| 2,646,465 | 7/1953 | Davis et al. | 179/16 |
| 2,663,758 | 12/1953 | Shepard | 178/17 |
| 2,679,636 | 5/1954 | Hillyer | 340/149 |
| 2,731,621 | 1/1956 | Sontheimer | 340/149 |
| 3,713,100 | 1/1973 | Hemstreet | 382/222 |
| 4,498,189 | 2/1985 | Mori | 382/30 |
| 4,581,760 | 4/1986 | Schiller et al. | 382/283 |
| 4,696,046 | 9/1987 | Schiller | 382/275 |
| 4,742,551 | 5/1988 | Deering | 382/170 |
| 4,752,966 | 6/1988 | Schiller | 382/125 |
| 4,896,363 | 1/1990 | Taylor et al. | 382/201 |
| 4,933,976 | 6/1990 | Fishbine et al. | 382/4 |
| 5,067,162 | 11/1991 | Driscoll, Jr. et al. | 382/126 |
| 5,146,548 | 9/1992 | Bijnagte | 395/117 |
| 5,204,761 | 4/1993 | Gusmano | 358/461 |
| 5,291,560 | 3/1994 | Daugman | 382/2 |
| 5,359,513 | 10/1994 | Kano et al. | 364/413.23 |
| 5,420,937 | 5/1995 | Davis | 382/125 |
| 5,467,403 | 11/1995 | Fishbine et al. | 382/116 |
| 5,594,813 | 1/1997 | Fandrianto et al. | 382/236 |
| 5,717,469 | 2/1998 | Jennes et al. | 348/571 |
| 5,768,441 | 6/1998 | Yoshizawa et al. | 382/270 |

FOREIGN PATENT DOCUMENTS

| | | |
|---|---|---|
| 0 125 532 A2 | 11/1984 | European Pat. Off. . |
| 0 251 504 A2 | 1/1988 | European Pat. Off. . |
| WO 97/38392 | 10/1997 | WIPO . |

*Primary Examiner*—Amelia Au
*Assistant Examiner*—Martin E. Miller

[57] ABSTRACT

A fast position tolerant and economical fingerprint verification algorithm and software implementation is disclosed. The algorithm has very important advantages in comparison to existing fingerprint verification algorithms like minutia extraction or full image analysis based on a series of two dimensional fast Fourier transforms (FFT's) and two dimensional cross correlation in speed, compactness of the biocript and finger positioning for verification. It is based on a small "yardstick" pattern being moved inside the image to be verified, and when a match is found the rest of the verification process is started. The software code implements the algorithm in the most efficient way for utilization on a digital signal processor architecture. A main area of application is in fingerprint identification and verification, but it could be implemented with same success in other image verification systems like iris, eye, face etc., where two images should be compared. The algorithm is adaptive, so various false acceptance and false rejection coefficients could be utilized very easily. It also produces a very compact biocript, which leads to better memory utilization in fingerprint databases.

25 Claims, 5 Drawing Sheets

SLIDING YARDSTICKS FINGERPRINT ENROLLMENT AND VERIFICATION SYSTEM AND METHOD

BACKGROUND OF THE INVENTION

Most popular with fingerprint verification devices vendors method used is the minutia based verification. This is also the oldest method used by the FBI and other government agencies and in other countries around the world. It is well established understood and standardized. There is an ANSI (American National Standards Institute) standard for "Data Format for the Interchange of Fingerprint Information", describing a common format for interchange of minutia based fingerprint data. Minutia data represents four categories of fingerprint characteristic points: ridge ending, bifurcation, compound (trifurcation or crossover) and type undetermined. Ridge ending occurs when a friction ridge begins or ends within the fingerprint and without splitting into two or more continuing ridges, and the ridge must be longer than it is wide. A bifurcation occurs when a ridge divides or splits to form two ridges that continue past the point of division for a distance that is at least equal to the spacing between adjacent ridges at the point of bifurcation. A compound type occurs either when there is trifurcation, which is when a single ridge splits into three ridges, or there is a crossover, i.e. when two ridges intersect each other. Finally when the minutia cannot be clearly categorized as one of the above three types it is designated as undetermined. Minutia based system, however, are pretty slow, and any defects in the input fingerprint image could generate false minutia. They are used predominantly in large fingerprint identification databases where input fingerprint data could be manually quality controlled and because minutia fingerprint data could be transferred between systems due to format standardization. They are also pretty expensive, which further limits their areas of application.

There are other systems, based on full image analysis. They perform complex two dimensional FFT's on the fingerprint data. Then in the frequency domain a two dimensional cross correlation is done between 2D-FFT of the fingerprint to be verified and the conjugate of the biocript image (or vice versa) and the cross correlation result is thresholded to determine if the images are similar. In some devices cross correlation is performed optically.

Those systems are usually much faster than the minutia based ones. However, the size of their template is usually much larger and they are not very suitable for large fingerprint data bases due to the nature of the verification process.

Both described systems are also very sensitive to finger placement on the fingerprint image scanner devices. Relatively small displacements or rotations of the finger could lead to false results.

OBJECTS AND SUMMARY OF THE INVENTION

The object of this invention is to create a system and algorithm in order to avoid shortcomings of the existing fingerprint enrollment and verification systems and algorithms.

The size of the template produced during enrollment is very compact, smaller than that of full image analysis systems, and comparable to that of minutia based systems.

Due to the hierarchical way of organization this algorithm is much faster than existing ones and also allows easy implementation in both, verification and identification systems—one to one, and one to many.

The template is comprised of a number of line patterns called for convenience "yardsticks". Those yardsticks represent parts of video lines from the acquired during enrollment process fingerprint image and are organized in a special order inside the template.

The consequential "sliding yardstick" comparison process with the fingerprint image acquired for verification, during verification part of the algorithm allows for very wide tolerances in regard to positioning and skew of the finger to be verified on the finger image input scanner device.

The code implementing the algorithm is very efficient and allows the use of low cost digital signal processor (DSP) engines. Memory requirements are very reduced.

This approach permits adjustments to be made for lower or higher false rejection or acceptance coefficients and the size of the template will change proportionally too. So, devices for various applications and market segments could be easily implemented.

BRIEF DESCRIPTION OF THE DRAWINGS

In describing the preferred embodiments, reference is made to accompanying drawings wherein:

FIG. 3a shows the start of the initial search, when the starting yardstick is sliding along the rows of the image to be verified, FIG. 3b shows the case, when the starting yardstick has found a match and the second yardstick is compared to a limited number of possible positions (three in this case). FIG. 3c shows the verification matching process in a very advanced stage, when the n-th yardstick, adjacent to the starting yardstick, has been tested for a match at a single position.

DETAILED DESCRIPTION OF PREFERRED EMBODIMENT

Figure 7:
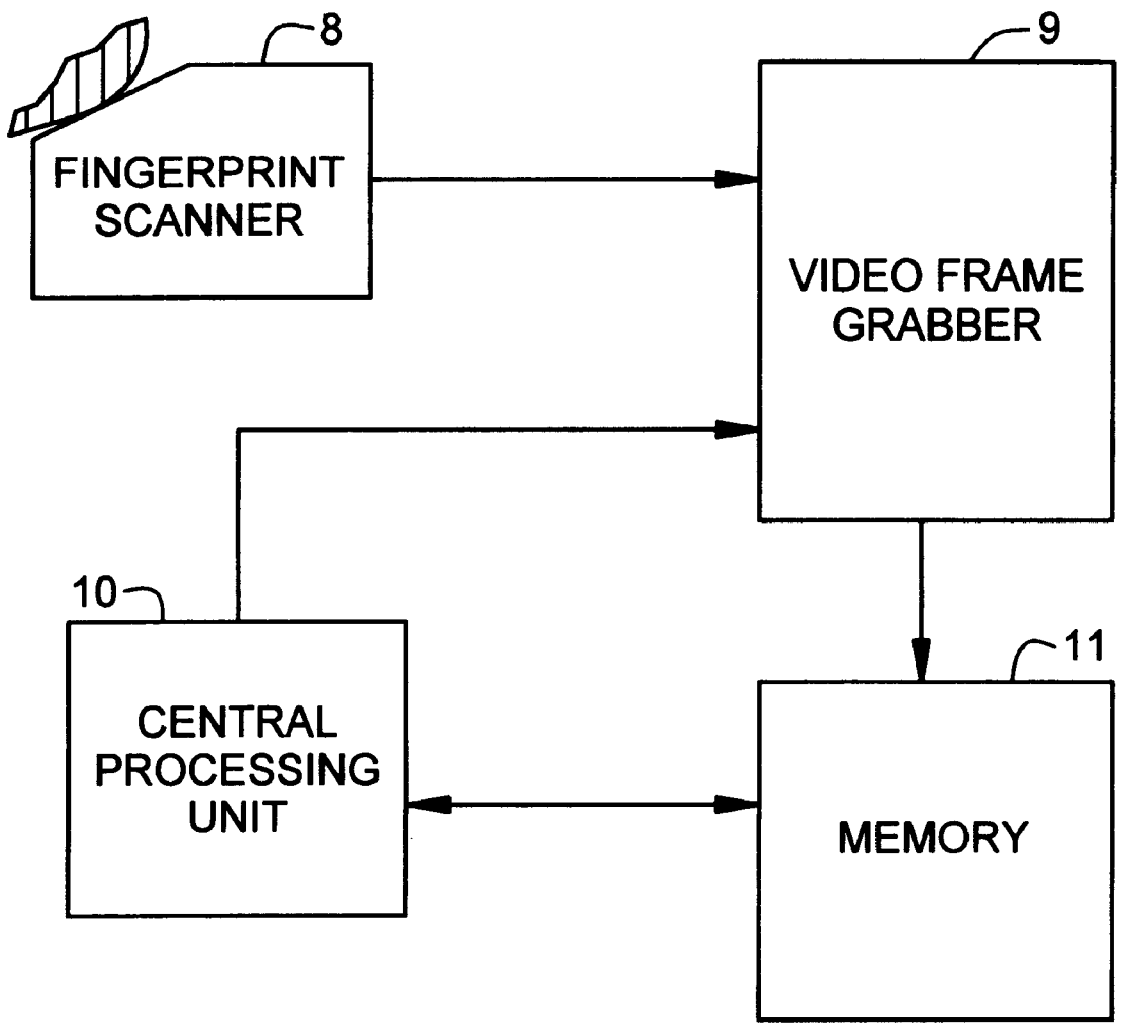
FIG. 7 shows a general block diagram of a fingerprint enrollment and verification system according to the preferred embodiment.

A general block diagram of a fingerprint enrollment and verification system is shown in FIG. 7. A fingerprint image scanner 8 translates the applied finger fingerprint image into a standard video signal. That video signal is applied to a video frame grabber 9. The video frame grabber 9 acquires video frames acquires, extracts fingerprint images of necessary pixel number size as required by the two parts of the fingerprint enrollment and verification algorithm and saves them into memory 11, under the control of a central processing unit 10. It is preferable if the frame grabber 9 had the ability to extract the exact pixel number size images before they are saved in memory 11, but it is not a problem if it saves images of standard size in memory 11, and the images necessary for the purposes of enrollment and verification are extracted later with the necessary size from those saved into memory 11.

Figure 1:
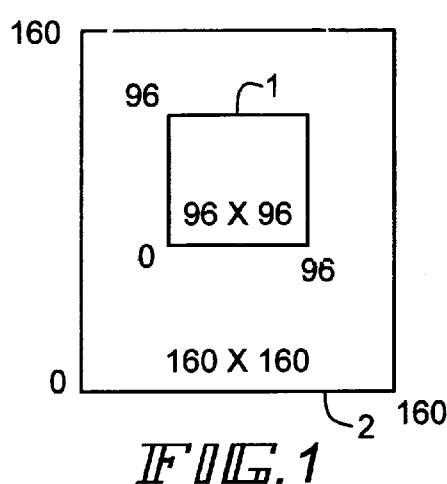
FIG. 1 shows an example and comparison of enrollment fingerprint image window placed inside the window used for verification during fingerprint verification algorithm.

FIG. 1 shows windows 1 and 2 which represent the sizes in pixels of the two images. The image that fits in window 1 is used for enrollment, and it has a selected size for the preferred embodiment of 96×96 pixels. The other image to be verified within window 2 during verification process has a size 160×160 pixels. The enrollment image will be called enrollment window 1 for brenity and as shown it is extracted from the middle of the acquired image inside the verification window 2.

The enrollment window 1, which as already said is extracted from the middle of the enrolled fingerprint image and has a size of 96×96 pixels is used to compose an enrollment template. It of course could be processed further to make the template more compact, but first this processing should be preferably lossless and reversible, and is not important for description of the "sliding yardstick" algorithm. This enrollment window 1 is further organized in patterns called for convenience yardsticks. Each yardstick represents a linear pattern exactly half a line from the enrollment window 1 in this embodiment, which means for the above window of 96×96 pixels, each yardstick will have 48 pixels size. If the image is of a line art type, then each pixel will be represented by a single bit. Those yardsticks are assigned sequential numbers defining in what sequence will they be used during comparison process with the image to be verified.

Figure 2:
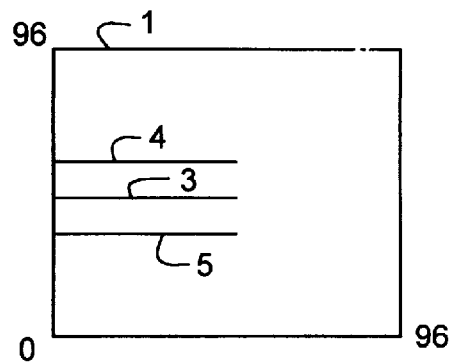
FIG. 2 shows only the enrollment fingerprint image window, which in this case has been selected to be of 96×96 pixels size, and also first three linear patterns (yardsticks), each of which in this case comprises one half of an enrollment image row. In other cases those yardsticks could be linear patterns, parts of the columns of the enrollment window.

It will be appreciated that the embodiment described above enrolls a fingerprint image and subsequently compares another fingerprint image for verification. The enrollment extracts yardsticks which may comprise half-lines, whole lines, or columns. The yardsticks are preferably of uniform size, and each yardstick contains black-white data (in the preferred embodiment) for the image to be enrolled. Preferably the enrollment stores data as a biocript in a suitable format. When comparing an image to be verified, in a simple case (for line art), the first yardstick is compared with the acquired image (which preferably is larger than the enrollment window). It will be understood that electronic signals or data for "images" are compared, rather than optical images themselves, in the preferred embodiment. In the preferred algorithm, the first (stored) yardstick is sought to be matched with a given line of the acquired image, and is compared on a bit-by-bit basis. Absent finding a match, the yardstick is shifted along the line, or, if necessary, will shift to another line, and seek a match along that row. Assuming a match results for the first yardstick, the second yardstick is next compared to the image to be verified, and can be shifted left or right a limited amount, or not at all, depending on skew. The best match is chosen, and the process continues for all yardsticks, of a first group, e.g. a column, can be matched. Then remaining yardsticks can be matched. If the best match is below a tolerance, verification is positive. Several modifications are described for the yardstick handling and for determining match criteria. This technique is applied also to grey scale data. FIG. 2 shows how yardsticks are numbered for this particular description of the sliding yardstick algorithm. The first yardstick 3 comprises the left half of line 31. The second yardstick 4 contains the left half of line 33. The third yardstick 5 occupies the left half of line 29, etc. The sixty-fourth yardstick is the right half of line 31 and so on. Note that depending on particular requirements any other sequence is possible and acceptable. It is also possible for other applications yardsticks to be vertical line patterns comprising parts of enrollment window 1. The yardsticks could be also whole lines or whole columns. The yardsticks could be also whole lines, or, respectively whole columns.

Figure 6:
FIG. 6 is an illustration of an enrollment template data structure usable with the preferred embodiment.

FIG. 6 shows an example of the template 7 produced during fingerprint enrollment process to be used later for verification purposes. The template 7 has a header, which could contain various types of useful data, like the person's ID, classification data etc. Its structure has not been described, because it has no relation to described algorithm. The header is followed by the type data field denoted with letter T on FIG. 6. The type data field T defines the type of algorithmic sequence used during verification and its purpose is to ensure future compatibility. Next field N contains the exact number and length of yardsticks following it, and the yardstick data from yardstick 1 to yardstick N follows. At the end of the template, there is an error control code field ECC.

Figure 8:
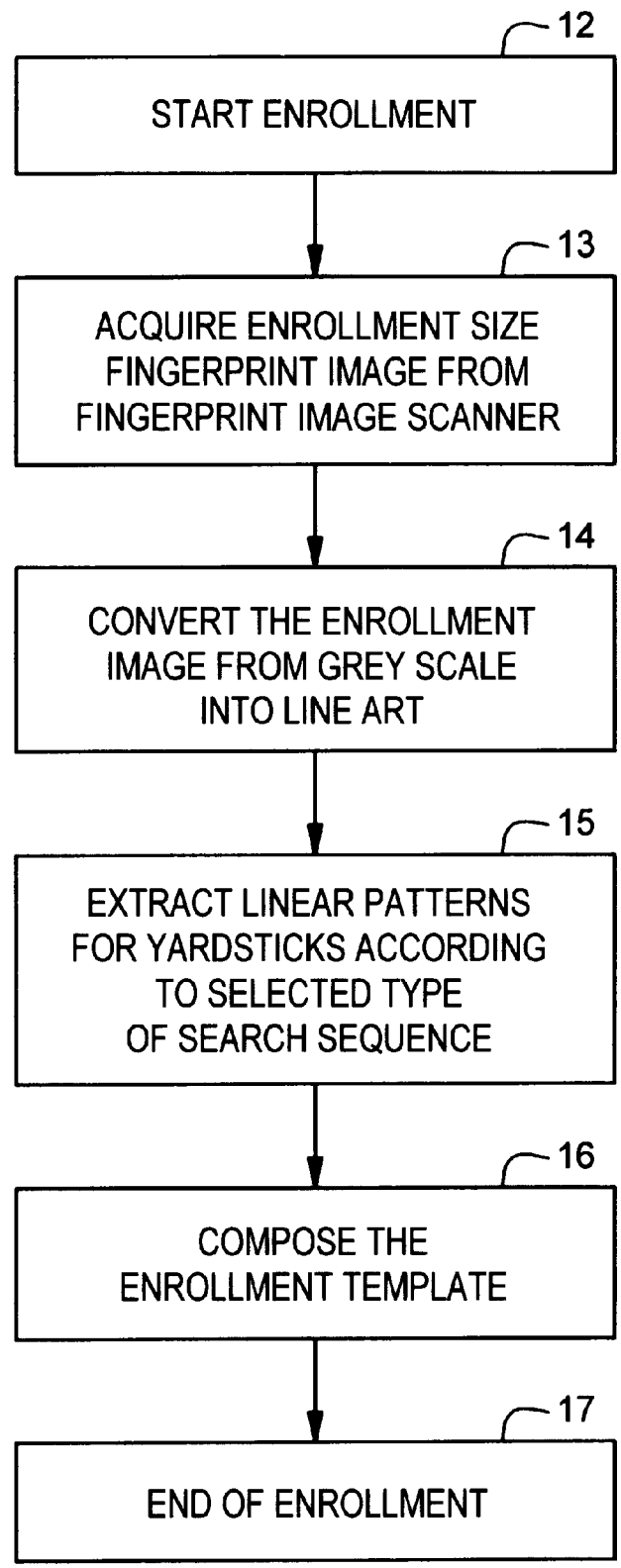
FIG. 8 shows the flowchart of the fingerprint enrollment process according to the preferred embodiment.

FIG. 8 shows the flowchart of the enrollment process. After the finger to be enrolled is placed on the fingerprint image scanner 8 and the command start enrollment 12 has been issued by the central processing unit 10, the frame grabber 9 at step 13 acquires from the middle of the acquired frame an image of 96×96 pixels size. At step 14, the image is then converted from grey scale into line art (black and white). Note that this conversion 14 could be done during acquisition phase 13, if the selected video frame grabber 9 is able to do so in real time. Then at step 15 the enrollment image 1 is decomposed into linear patterns called yardsticks, and in a sequence defined by the search algorithm as shown on FIG. 2. Note that depending on the requirements toward the false acceptance and false rejection coefficients it could happen that not all linear pattern could be saved as yardsticks. In this case the maximum possible number of yardsticks will be 192 (96 in each of the two columns), but it is possible that only 96 (only from odd numbered lines) would be enough. This makes this algorithm exceptionally flexible and economical. On the base of created yardsticks, a template for the enrolled finger is created at step 16 with structure described on FIG. 6, stored in memory 11 and this ends the enrollment process at 17. Thus, as explained herein data from a finger is acquired, processed, and stored, in the preferred embodiment.

Figure 3A:
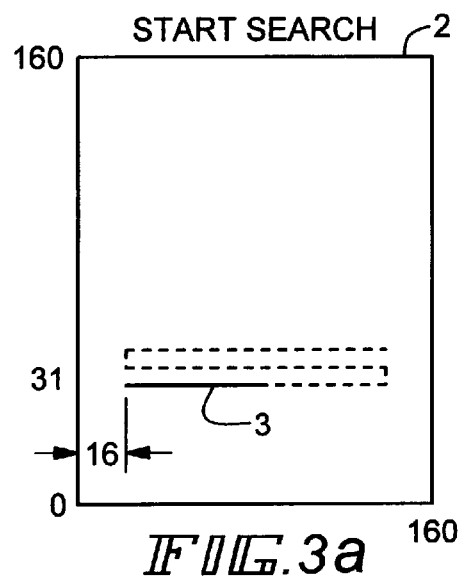
FIGS. 3a, 3b, and 3c represent various stages of the "sliding yardstick" verification process of the present invention.

FIG. 3a,b,c helps to illustrate the verification process of the sliding yardstick fingerprint enrollment and verification algorithm. An image of a fingerprint is acquired and sought to be verified as corresponding to a stored (enrolled) fingerprint.

The acquired image to be verified is always symmetrically larger than the window used for enrollment. As it could be seen from FIG. 1, in this case the image in the verification window 2 is of size 160×160 pixels, while the enrollment window 1 has a 96×96 pixels size. This is necessary to accommodate offsets and skews between the two images.

The algorithm begins with a search for match for the start yardstick (the first yardstick) 3 inside the image to be verified 2.

First yardstick one 3 is compared in this case first with an equal number of pixels, in this case forty eight pixels on line 31 of the image to be verified, starting from pixel 24 (FIG. 3a). If no match is found, the first yardstick 3 is shifted a pixel to the right and compared with next forty eight pixels, starting from pixel 25 respectively. This shift comparison is performed until the end of the line(pixel 96 in this case). Then the first (start) yardstick 3 moves to the line, line 32 in this case, and process repeats itself. In fact how close to the ends of the line the yardstick is to be moved depends on requirements towards the acceptable offset of the image 2 to be verified in regard to the image used during enrollment 1.

The process repeats itself until a match is found.

When a match for first yardstick 3 is found, a comparison process for the second yardstick 4 begins. Yardstick 4, however, already has a fixed position in regard to yardstick 3. It is one line over yardstick 3, according to described algorithm and could be shifted a pixel to the left or right of yardstick 3, due to the skew between the image to be verified and the original enrollment image (note that all numbers are for illustration purposes only ), or it could be right above yardstick 3. So, second yardstick 4 is compared only with those three positions and the position selected is the one with the best match. This process continues until all yardsticks in the column of first yardstick 3 are matched, then the sixty-fourth yardstick 6 (as shown on FIG. 3c), situated beside first yardstick 3 is compared. The yardsticks in the right column, i.e. containing the 64th yardstick, do not need to be shifted. If the matching process is considered positive, but if the conditions are not met the verification has failed.

In order to increase performance, the algorithm will be interrupted if a number of yardsticks have been mismatched, no matter that the start yardstick did match.

In order to make the system more tolerant to image impediments (finger cuts, dirt etc.), if the first yardstick 3 does not find a match, in the whole image to be verified, in a next cycle the start yardstick will be assigned to the mirror yardstick, right half of line 31 in this case, and correspondingly other yardsticks will be mirrored, so they will be in this new start yardstick column. Another way to select the new start yardstick is to use a random number generator, or any other mathematical selection tool.

When used for fingerprint verification or a similar application, this algorithm brings the following additional benefits.

1. It will be equally efficient using static fingerprint placement, as well as in scanners employing sliding finger with multiple images.

2. The false acceptance ratio and false rejection ratio requirements directly affect the number of yardstick comparisons and as well the number of yardsticks used. This means that the size of the template and computing power requirements will be affected. Lower false acceptance requirements thus will generate smaller template and require a lower level of computing power. This allows the system to be tailored to fit any particular requirements.

Figure 3B:
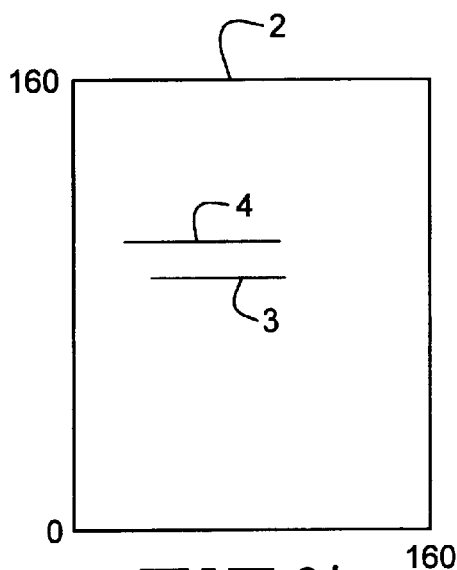
Figure 3C:
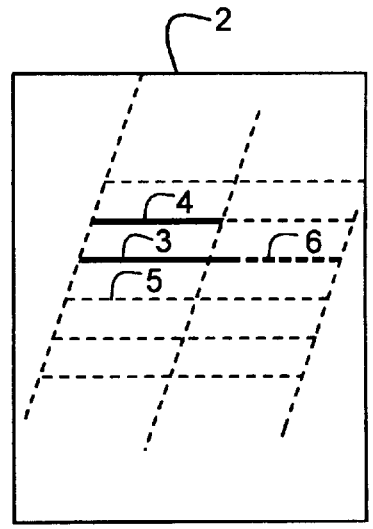

As it is quite obvious from illustrations of FIGS. 3a, 3b, and 3c, the starting yardstick 3 quite effectively compensates for any horizontal and/or the acquired offset between verified image 2 and the enrollment window 1 within certain constraints limited only by the size of the verified image 2.

Figure 5A:
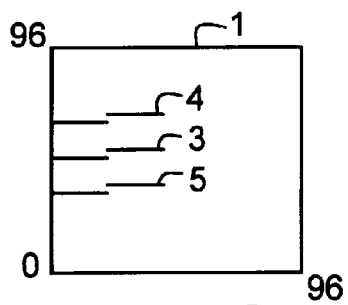
FIG. 5a and FIG. 5b show enrollment windows where each yardstick is composed from parts of two adjacent rows.
Figure 5B:
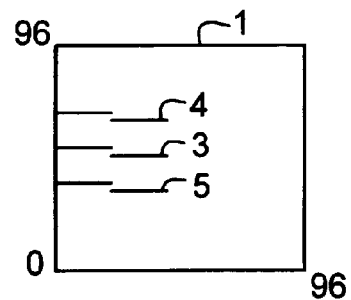

Correspondingly subsequent yardsticks effectively eliminate skews between the acquired image to be verified and the enrollment window. Of course large skews lead to geometrical distortions, so, if very high skew tolerance is needed, it will effectively require either two line yardsticks (see FIGS. 5a,b) and triple repetition of the algorithm first with single line yardsticks (FIG. 2) and then consequently with yardsticks on FIGS. 5a and 5b. Another solution is to ease the requirements toward false acceptance and false rejection coefficients of the fingerprint verification system.

Most important aspect for ensuring the proper operation of the sliding yardstick algorithm is the use of right method for matching yardsticks to pixel patterns in the image to be verified.

Several fuzzy logic approaches could be implemented, depending the structure of the verified image and the set of yardsticks.

The first case covers line art where the image 2 to be verified has a one bit pixel depth, and same regarding yardsticks. In this case a minimum Hamming distance matching is performed.

Figure 4:
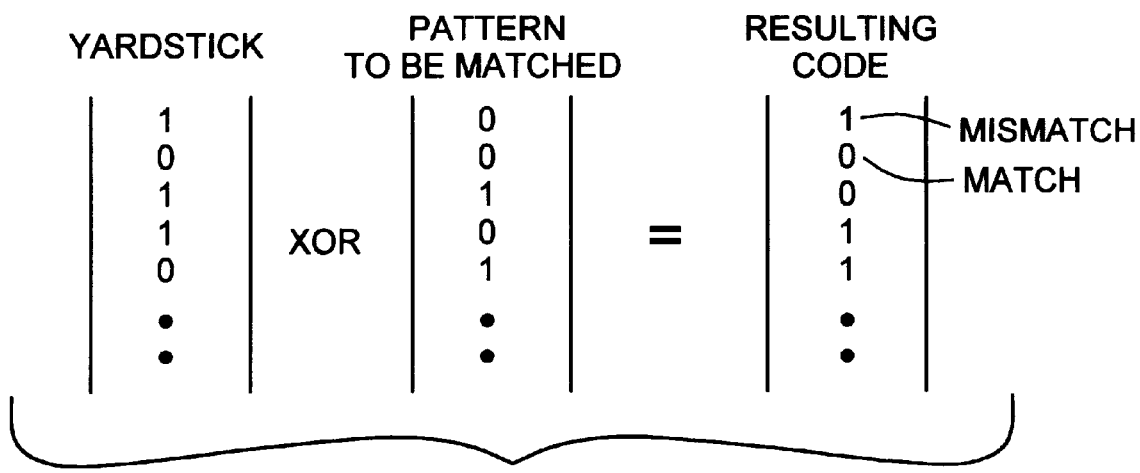
FIG. 4 is an illustration of how to calculate Hamming distance.

FIG. 4 helps to understand how the Hamming distance is calculated. Bits comprising the yardstick are exclusive or-ed with corresponding bits of the pattern from the acquired image to be matched. If bits coincide, i.e. one and one, or zero and zero, the resulting bit will be zero, however if those bits don't coincide, i.e. zero and one, or one and a zero, the resulting bit is one. The number of ones is then counted and divided by the length of the sequence (in this case as far as the length of the sequence is fixed there is no need to divide by it, when used for internal implementations).

If the result is 0, that means both sequences are identical, but if it is 0.5 that means full randomness.

In the sliding yardstick algorithm, the Hamming distance is used the following way. First the distance is calculated, and if it is above a certain threshold (0.15 in this particular application) the first yardstick 3 slides by one pixel in the selected direction in relation to the line from the image 2 currently tested for a match. A new Hamming distance is calculated. If this new Hamming distance is below the threshold, a new shift is performed and a corresponding Hamming distance is calculated. This process is repeated until the Hamming distance starts to increase, which means that a minimum distance was determined. To go back to that minimum distance, then a pixel back shift is performed. After that the line above and exactly above the same place where the minimum Hamming distance on the current line was calculated is matched and if its Hamming distance is lower than a minimum in this direction is sought same way as it was done along a line. This way the best guess matching is performed (for the first yardstick).

For second yardstick 4, however, the following procedure is applied. The minimum Hamming distance is found based on the three positions as described before. After that the average Hamming distance is calculated. This will be equal to the sum of all minimum Hamming distances of previous yardsticks, including the present one, and divided by the number of yardsticks for which minimum Hamming distance has been already calculated. This average Hamming distance is then compared to a threshold, which, preferably, for first predefined number of yardsticks is higher (0.15 in this example ) and goes down in stages when number of yardsticks exceeds certain predefined numbers. Thus, the average minimum Hamming distance is calculated for the second through n-th yardstick best match positions and compared to thresholds which are in some inverse relationship to the number of yardsticks.

This kind of organization allows some image defects (poor contact, cuts, dirt etc.) to be effectively eliminated if they are local or relatively small in size.

At the same time, by controlling threshold values, various false acceptance and false rejection ratios could be achieved depending on the requirements of any particular application.

If the image to be verified 2 is in grey scale, where, for example, each pixel is eight bits deep (any other depth is possible) and the yardstick is of line art type (one bit pixel depth), before the beginning of comparison either the whole image, or more economically the line or part of it which is to be compared with the current yardstick, is converted into line art. This, preferably, is done the following way: all pixels lower than 50% (7f hex in this example) are translated into 0's, and those above 50% into 1's. The comparison then is performed the same way as already described for the line art case.

When yardsticks and the image to be verified 2 are both grey scale, they are either first translated into line art or the comparison could be done the following way: first each pixel from the current yardstick is subtracted from the corresponding pixel in the verified image; the absolute value from the difference is then compared to a predetermined threshold, and if it is above this threshold it is assigned a one, but if it is below it is assigned a zero. As previously described, one's are mismatches and zero's matches, so, the Hamming distance could be calculated and the rest of the algorithm follows the rules already described.

The sliding yardstick algorithm is equally applicable to static finger placement and dynamic finger sliding in the same way. In real time a frame with the finger image to be compared is acquired, and the verification process is performed. If verification is successful, the algorithm ends, but if it is—unsuccessful, then another frame of the fingerprint image is acquired and sought to be verified. This continues until either a successful verification occurs or rejection occurs due to a preset timeout. This multiple frames verification process allows poor images due to poor contact or placement of the finger to be minimized.

Figure 9:
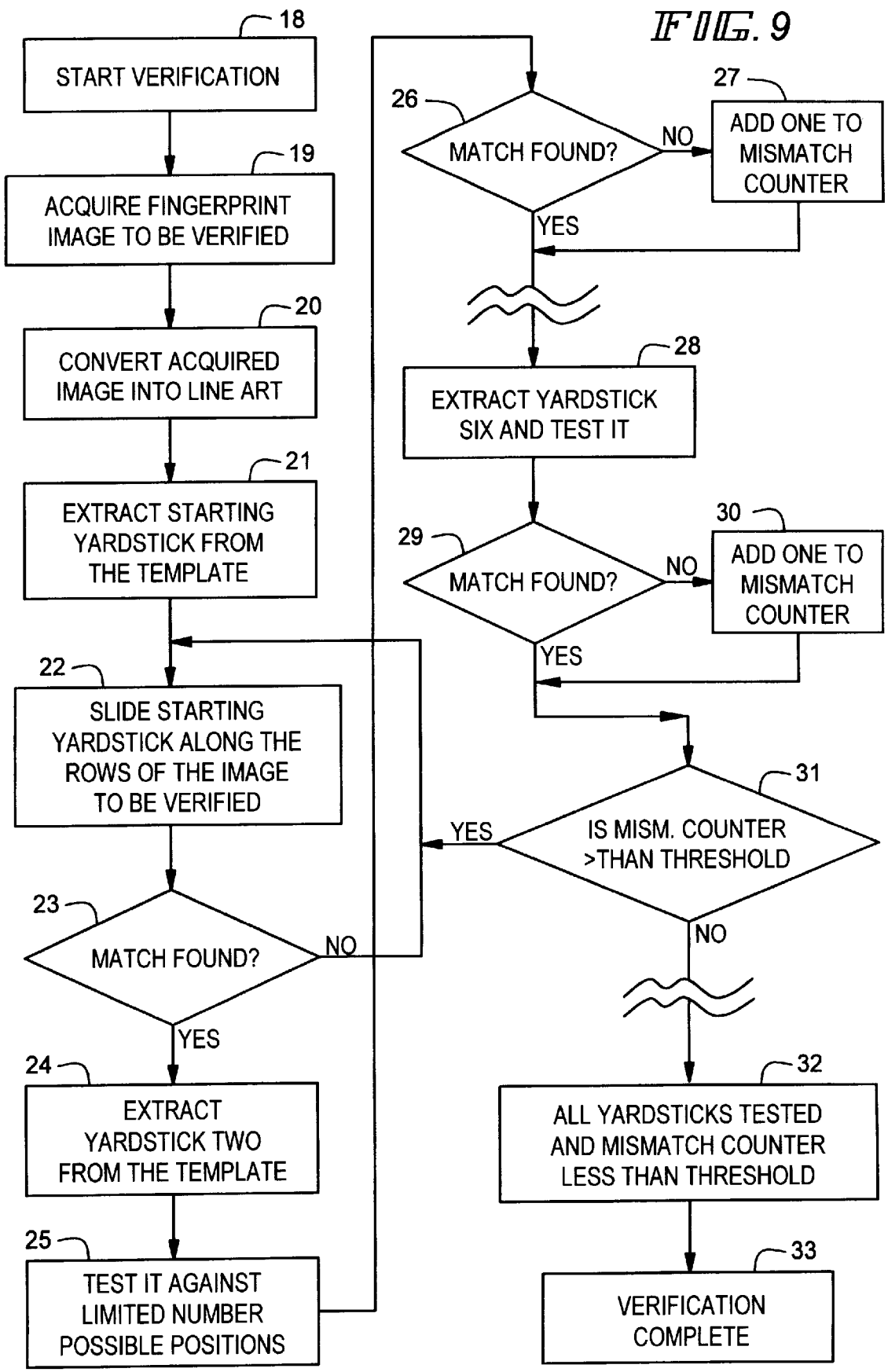
FIG. 9 shows the flowchart of the fingerprint verification process according to the embodiment.

The flowchart shown on FIG. 9 helps to explain how the fingerprint verification process is performed by the sliding yardstick fingerprint enrollment and verification system, according to the preferred embodiment.

After a start verification 18 command has been issued by the central processing unit 10, at step 19 video frame grabber 9 acquires the image to be verified 2. In the next step 20 image is converted from grey scale into a line art image.

At step 21, the starting (first) yardstick 3 is then extracted from the verification template, and the process of sliding it and matching it along the rows of the image to be verified begins at step 22. This process was described above. If a match is found, the second yardstick 4 is extracted from the template. At step 24, and tested at step 25 against limited possible positions for a match. If a match is not found, a logic one is added to a mismatch counter at step 27. But if a match is found, the mismatch counter is not modified and next (third) yardstick 5 is extracted from the template and tested for a match in a limited number of possible positions in regard to first yardstick 3. This repeats itself with the subsequent yardsticks up to the sixth yardstick (in this example). After a match for this yardstick has been completed at step 29, the value inside the mismatch counter is tested at step 31. If it is greater than a predetermined value, which has been selected to be two in this implementation 31, the match of the first yardstick 3 is considered false, and everything starts from block 22 of the flowchart on FIG. 9. For next matches the threshold of the mismatch counter is correspondingly increased. The verification process is considered successful when the last yardstick has been matched and the mismatch counter is below the final threshold value, at step 32. The central processing unit 10 ends the image verification algorithm at step 33.

This flowchart, because of limitations of space, does not show what happens if the starting (first) yardstick 3 does not find a match. In this case, the process returns to step 19 where the frame grabber 9 acquires a new image to be verified and the algorithm repeats itself, until either successful verification occurs, or the system times out.

It is obvious that by varying the values of thresholds used for the Hamming distance matching, and those used for the mismatch counter, various requirements toward the false acceptance and false rejection coefficients values could easily be met.

It will be appreciated that the embodiment described above uses a novel process to enroll a fingerprint image (image data) and uses a novel process for subsequently comparing another fingerprint image for verification. The enrollment process extracts yardsticks which may comprise half-lines, whole lines, or columns. The yardsticks are preferably of uniform size, and each yardstick contains black-white data (in the preferred embodiment) for the image to be enrolled. Thus each yardstick may comprise a set of pixels taken from a line or column or portion thereof Each yardstick represents a set of preferably co-linear pixels, sometimes referred to as a linear "pattern." It will be appreciated that a linear "pattern" can be taken horizontally or vertically. As used herein, linear "pattern" does not refer to minutiae or feature data, but instead to a set of (usually) successive co-linear pixels. Thus, the present invention does not need to locate minutiae or known types of features in the enrollment image, but instead obtains sets of pixels from the enrollment image, regardless of what image they define and without regard to whether they define any known minutia or feature. Preferably the enrollment process stores data as a data structure, called a template, in a suitable format.

When comparing an image (image data) to be verified against an enrolled image or enrolled fingerprint data, in a simple case (for line art), a first yardstick from the template is compared with the acquired image (which preferably is larger than the enrollment window). In the preferred algorithm, the first (stored) yardstick is sought to be matched anywhere within a given line of the acquired image, and the yardstick is compared (i.e., its pixels are compared) on a pixel-by-pixel basis to a set of successive pixels of the image to be verified corresponding in length to the length of the yardstick. Absent finding a match at a first location in the image to be verified, the yardstick is shifted along the line and tested, and then shifted and tested again and again, and, if necessary, will shift to another line, seeking a match along that row. (It will be understood that column-wise yardsticks and comparisons are contemplated.) Assuming an acceptable match results for the first yardstick, the second yardstick is next compared to the image to be verified, and can be shifted left or right, or not at all, depending on skew. The best match is chosen, and the process continues until all yardsticks of a first part, e.g. a left side of the image, are matched. Then further remaining yardsticks are sought to be matched with the image to be verified. If the quality of the best match is within tolerance, verification is positive. Not all of the yardsticks need to be used, and in one embodiment, only six yardsticks are processed. Several modifications are described for the yardstick handling and for determining match criteria. If no match is found for the first selected yardstick, then another first yardstick can be selected. This technique is applied also to grey scale data.

While the above described embodiments of the inventions are the preferred ones, it is apparent for those skilled in the art that many other changes and modifications may be made without departing from the invention in its broader aspects.

Therefore, the intention of the claims is to cover such changes and modifications falling within the true spirit and scope of the invention.

The embodiments of the invention in which an exclusive property or privilege is claimed are defined as follows:

What is claimed is:

1. An enrollment system for biometric identification device comprising:

an input device to provide signals representing an enrollment image wherein said enrollment system includes a processing unit to extract a plurality of yardsticks from said enrollment image;

each said yardstick comprising a one dimensional pixel array having a predetermined number of either horizontal or vertically oriented, consecutive, co-linear pixels corresponding to a predetermined portion of a row or column of pixels within said enrollment image, each yardstick having a predetermined spatial relationship within said enrollment image relative to each of said other yardsticks, the maximum number of said yardsticks being substantially smaller than the maximum number extractable from the enrollment image; and wherein said processing unit stores said yardsticks in said memory based upon their relative spatial relationship to each other.

2. An enrollment system as claimed in claim 1, wherein said predetermined locations for a said array are located within a selected one of a single column and a single row from said enrollment image.

3. An enrollment system as claimed in claim 1, wherein said enrollment image is saved into said memory as a binary image with one bit pixel size.

4. A fingerprint enrollment system as claimed in claim 1, wherein said yardsticks correspond to lines of pixels having uniform length.

5. An enrollment system as claimed in claim 1, wherein said yardsticks are composed into a data structure constituting an enrollment template in a predetermined order.

6. An enrollment system according to claim 1 further including a data structure, including said yardsticks in a predetermined order, stored in said memory.

7. An enrollment and verification system for biometric identification device comprising:

an input device to provide signals representing an enrollment image wherein said enrollment system includes a processing unit to extract a plurality of yardsticks from said enrollment image;

each said yardstick comprising a one dimensional pixel array having a predetermined number of either horizontal or vertically oriented, consecutive, co-linear pixels corresponding to a predetermined portion of a row or column of pixels within said enrollment image, each yardstick having a predetermined spatial relationship within said enrollment image relative to each of said other yardsticks, the maximum number of said yardsticks being substantially smaller than the maximum number extractable from the enrollment image; and wherein said processing unit stores said yardsticks in said memory as a data structure based upon their relative spatial relationship to each other;

wherein for verification, a current line is obtained from an image to be verified, a first one of said plurality of yardsticks from said data structure is compared for a match to a line of pixels of the same size in said current line, wherein if there is no match, the first yardstick shifts relative to the line of pixels from the current line and is tested for a match thereto, wherein said shifting and then comparing iterates through said current line from the image to be verified until a match is found, wherein if the current line has been tested with said first yardstick and no match found a next line from the image to be verified is obtained and said first yardstick comparison process repeats, and wherein said shifting and then if necessary moving, to a next line iterates until a match is found, wherein after a match is found for said first yardstick, a next one of said plurality of yardsticks from said data structure is compared to a predetermined set of lines of pixels from the image to be verified and spaced from the location of said previously matched yardsticks based upon the spatial relationship of the said predetermined yardstick locations;

the verification process continues to attempt to find the best match of all of the yardsticks in the data structure until the final yardstick is matched and the best match within said predetermined set is selected;

wherein said verification process exits after the last yardstick from the data structure has been matched;

said processing unit outputs a match indication signal.

8. A biometric verification system, comprising:

an input device to provide signals representing images acquired from a predetermined part of a body;

a memory;

a control system including a central processor unit, wherein said control system is coupled to control the operation of said verification system, and a data structure stored in said memory; said data structure including a plurality of yardsticks having a predetermined spatial relationship to one another in an enrolled image;

each said yardstick is a one-dimensional array having a predetermined number of either horizontal or vertically oriented, consecutive, co-linear pixels and the maximum number of yardsticks being substantially less than the maximum number extractable from said enrolled image, said enrolled image is smaller, in pixel dimensions, than the input image; each yardstick representing a predetermined location within an enrollment window;

wherein said yardsticks are compared in a predetermined fashion for a match to co-linear pixels of an image to be verified; and wherein for verification, a current line is obtained from an image to be verified, a first one of said plurality of yardsticks from said data structure is compared for a match to a line of pixels of the same size in said current line, wherein if there is no match, the first yardstick shifts relative to the line of pixels from the current line and is tested for a match thereto, wherein said shifting and then comparing iterates through said current line from the image to be verified until a match is found, wherein if the current line has been tested with said first yardstick and no match found a next line from the image to be verified is obtained and said first yardstick comparison process repeats, and wherein said shifting and then if necessary moving, to a next line iterates until a match is found, wherein after a match is found for said first yardstick;

a next one of said plurality of yardsticks from said data structure is compared to a predetermined set of lines of pixels from the image to be verified and spaced from the location of said previous yardstick based upon the spatial relationship of the said predetermined yardstick locations;

the verification process continues to attempt to find the best match of all of the yardsticks in the data structure until the final yardstick is matched and the best match within said predetermined set is selected;

wherein said verification process exits after the last yardstick from the data structure has been matched.

9. A verification system as claimed in claim 8, wherein if the best matches for a predetermined number of yardsticks fail to meet predetermined thresholds the verification process is interrupted before its end.

10. A verification system as claimed in claim 8, wherein the test for matching a yardstick to a line of pixels of the same size from the image to be verified is performed by calculating the Hamming distance between them and comparing it to a predetermined threshold.

11. A verification system as claimed in claim 8, wherein the test for matching said yardsticks to said lines of pixels from the image to be verified is one by calculating the average Hamming distance, equal to the sum of all calculated Hamming distances for all already matched yardsticks, plus the Hamming distance calculated for the current test and dividing said sum by the number of matched yardsticks including the current one.

12. A verification system as claimed in claim 8, wherein the image to be verified is converted into a binary line art image with one bit pixel size and then saved into said memory.

13. A verification system as claimed in claim 8 wherein if the first yardstick fails to find a match in the acquired image to be verified, a next image to be verified is acquired stored into memory and said first yardstick is tested for a match from the same position it started said tests with previous image to be verified.

14. A verification system as claimed in claim 13, including selecting another one of said yardsticks as a first yardstick for testing against said next image to be verified.

15. A method for verification of two images where the first image is used for verification and the second image is to be verified and said first image is smaller in pixel number size in row and column directions than said second image, the method including;

deriving from said first image a plurality of yardsticks, the maximum number of said yardsticks being substantially smaller than the maximum number extractable from said first image, each yardstick comprising a one dimensional array of data representative of a plurality of successive co-linear pixels;

wherein each yardstick represents pixels from a single corresponding row or a single corresponding column of pixels from said first image, and wherein said plurality of yardsticks are organized in a predetermined order corresponding to their relative positions to each other;

wherein a first yardstick from said data structure is tested for a match by sliding it to multiple positions along the lines of the second image in a predetermined order and at each said position comparing the first yardstick to line portions of corresponding pixel number size, representing parts of the selected one of lines and columns from the second image; wherein if a match is found for said first yardstick, then a next yardstick is tested for best match within only a predetermined number of possible positions relative to the location in the second image where the first yardstick was successfully matched; and wherein successive yardsticks are tested for best match in the same manner as said second yardstick but at respectively different locations relative to the previous yardsticks matched within the second image.

16. A method of claim 15, wherein said first and second images are of binary type, wherein the pixel size in each is one bit deep and wherein the lines of successive pixels represented by said yardsticks are all parallel.

17. A method of claim 15, wherein the test for matching of said yardsticks to corresponding line portions from the second image is performed by calculating the average Hamming distance between said line portions and the yardsticks and comparing the resulting Hamming distance to at least one predetermined threshold.

18. A method of claim 17, wherein said average Hamming distance is equal to the sum of calculated Hamming distances for all already matched yardsticks, plus the Hamming distance calculated for the current yardstick matching to a linear portion from the second image, and wherein said sum is then divided by the total number of matched yardsticks including the current one.

19. A method of claim 17, wherein the magnitude of said threshold varies as the verification process progresses.

20. A method of claim 15, wherein if a measure of a best match for the yardsticks following the first yardstick fails to meet the at least one predetermined threshold, the value of a mismatch counter is changed.

21. A method of claim 20, wherein the value in said mismatch counter is tested for a predetermined value, and if a match is detected, the verification process is interrupted.

22. A method of claim 21, wherein when said verification process has been interrupted, the search for a match for said first yardstick proceeds further from the point of last match for the first yardstick, until a new match is found.

23. A method of claim 21, where said predetermined value is variable and is a function of the number of yardsticks already tested for a match.

24. A method of claim 15, wherein if no match is found for said first yardstick, the verification process for a next image to be verified starts from beginning test parameters.

25. A method of claim 24, wherein whenever the new search for a match begins, another yardstick is selected from said data structure and used as a first yardstick.

* * * * *